(12) United States Patent
Farrugia

(10) Patent No.: US 7,684,185 B2
(45) Date of Patent: Mar. 23, 2010

(54) INTEGRATED MONITOR AND DOCKING STATION

(75) Inventor: Augustin Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 11/481,153

(22) Filed: Jul. 3, 2006

(65) Prior Publication Data
US 2008/0002350 A1 Jan. 3, 2008

(51) Int. Cl.
H05K 7/14 (2006.01)

(52) U.S. Cl. .............. 361/679.41; 361/679.4; 361/679.22; 710/303; 248/918

(58) Field of Classification Search ......... 361/679, 361/681, 682, 683, 728, 735, 686, 679.41–679.45, 361/679.4, 679.22; 710/303; 248/918
See application file for complete search history.

(56) References Cited

U.S. PATENT DOCUMENTS

| 4,387,951 | A | * | 6/1983 | Hall et al. | 439/299 |
| 5,257,163 | A | * | 10/1993 | Buist et al. | 361/686 |
| 5,604,663 | A | * | 2/1997 | Shin et al. | 361/679.43 |
| 5,687,060 | A | * | 11/1997 | Ruch et al. | 361/679.43 |
| 5,774,332 | A | * | 6/1998 | Ruch et al. | 361/679.41 |
| 5,798,951 | A | * | 8/1998 | Cho et al. | 710/303 |
| 5,822,181 | A | * | 10/1998 | Jung | 361/683 |
| 5,991,838 | A | * | 11/1999 | Swindler et al. | 710/303 |
| 6,091,602 | A | * | 7/2000 | Helot | 361/679.44 |
| 6,185,094 | B1 | * | 2/2001 | Ruch et al. | 361/679.44 |
| 6,256,193 | B1 | * | 7/2001 | Janik et al. | 361/679.59 |
| 6,414,841 | B1 | * | 7/2002 | Chang | 361/682 |
| 6,487,068 | B1 | * | 11/2002 | Rahemtulla | 361/681 |
| 6,490,154 | B2 | * | 12/2002 | Thompson | 361/679.41 |
| 6,545,864 | B2 | * | 4/2003 | Davis, IV | 361/683 |
| 6,643,127 | B1 | * | 11/2003 | Richardson | 361/686 |
| 6,717,798 | B2 | * | 4/2004 | Bell et al. | 361/679.41 |
| 6,807,055 | B2 | * | 10/2004 | Usui et al. | 361/679.4 |
| 6,823,415 | B1 | * | 11/2004 | Asaad et al. | 710/303 |
| 6,987,666 | B2 | * | 1/2006 | Medica et al. | 361/681 |
| 7,092,248 | B2 | * | 8/2006 | Shu | 361/683 |
| 7,271,997 | B2 | * | 9/2007 | Kee et al. | 361/679.27 |
| 7,522,412 | B2 | * | 4/2009 | McEwan et al. | 361/679.02 |
| 2001/0046305 | A1 | * | 11/2001 | Muranami et al. | 381/77 |
| 2003/0198008 | A1 | * | 10/2003 | Leapman et al. | 361/681 |
| 2006/0039105 | A1 | * | 2/2006 | Smith et al. | 361/681 |
| 2006/0250767 | A1 | * | 11/2006 | Brophy et al. | 361/686 |

* cited by examiner

Primary Examiner—Jayprakash N Gandhi
Assistant Examiner—Ingrid Wright
(74) Attorney, Agent, or Firm—Van Pelt, Yi & James LLP

(57) ABSTRACT

A docking station is disclosed. The docking station includes a display and a housing configured to hold the display in a manner that exposes a viewing surface of the display to view. The housing defines a docking area configured to receive a portable computer. The docking area is at least partly obscured by the display when viewed from the viewing surface side of the display at an angle substantially orthogonal to the viewing surface.

26 Claims, 4 Drawing Sheets

INTEGRATED MONITOR AND DOCKING STATION

BACKGROUND OF THE INVENTION

Traditionally a portable computer docking station requires a separate external monitor to be connected (e.g., by cable) to the docking station when a display other than the integrated display of the portable computer is desired to be used with the docking station. Often a significant amount of desk space is required for placement of this docking station and separate display. Attempts have been made to conserve the required amount of desk space by allowing the external display to be stacked on top of the docking station. However, the stacked combination still occupies a large amount of space and is cumbersome to move and transport. Therefore there exists a need for a docking station and display combination that is configured in a more efficient form.

BRIEF DESCRIPTION OF THE DRAWINGS

Various embodiments of the invention are disclosed in the following detailed description and the accompanying drawings.

FIG. 1A is a diagram illustrating a front view of the docking station.

FIG. 1B is a diagram illustrating a rear view of the docking station.

FIG. 1C is a diagram illustrating a side view of the docking station without a docked portable computer.

FIG. 1D is a diagram illustrating a side view of the docking station with a docked portable computer.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A docking station is disclosed. In some embodiments, the docking station includes a display and a housing configured to hold the display in a manner that exposes a viewing surface of the display to view. The housing including a docking area configured to receive a portable computer. The docking area is at least partly obscured by the display when viewed from the viewing surface side of the display at an angle substantially orthogonal to the viewing surface. The display is configured to display an image rendered by the portable computer at least when the portable computer is docked in the housing. In some embodiments, when the portable computer is docked in the docking station, a first plane parallel to the viewing surface is substantially parallel to a second plane parallel to a primary plane of the docked portable computer (e.g., largest plane and/or plane parallel to a display integrated with the docked portable computer). In some embodiments, a plane parallel to at least one largest face of an imaginary rectangular polyhedron of the least possible volume that can contain the portable computer docked in the housing is more parallel than normal (i.e., perpendicular) to the direction of gravity.

Figure 1A:
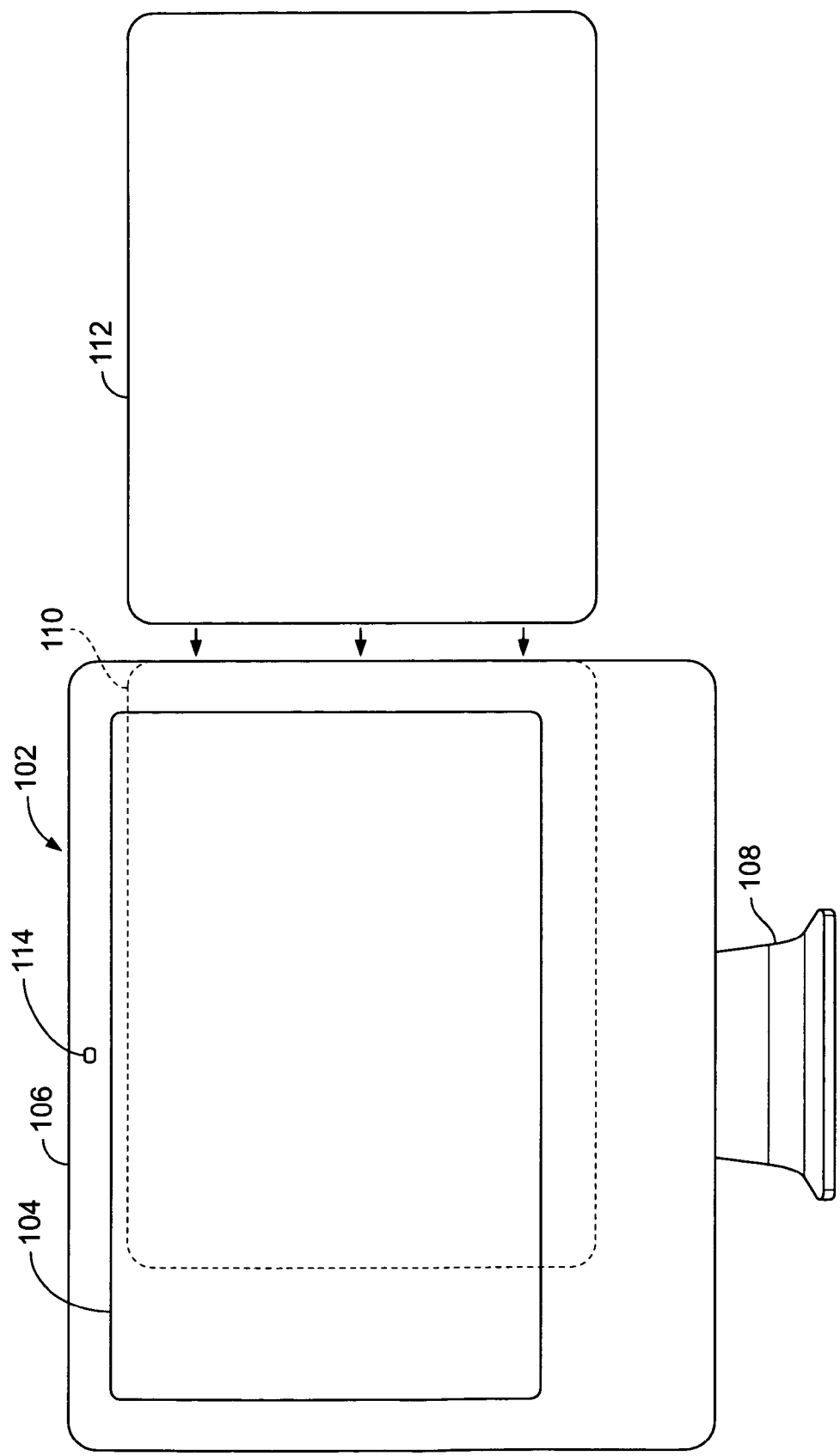
FIGS. 1A-1D illustrate an embodiment of a docking station.

FIGS. 1A-1D illustrate an embodiment of a docking station. FIG. 1A is a diagram illustrating a front view of the docking station. Docking station 102 includes display 104, housing 106, and stand 108. Stand 108 supports docking station 102 on a horizontal surface (e.g. desk). Stand 108 is merely an example. In various embodiments, one or more other types of stands are used to support docking station 102. In some embodiments, stand 108 is removable. In some embodiments, docking station 102 can be mounted on a vertical surface (e.g., wall) and stand 108 is omitted. In some embodiments housing 106 includes an integrated stand, or a base portion configured to rest on a horizontal surface without requiring a separate stand, and stand 108 is omitted. Dotted box 110 outlines a docking area configured to receive portable computer 112. Portable computer 112 slides into docking area 110 for docking. In the example shown, docking area 110 is a cavity of docking station 102 at least partially located behind display 104, such that display 104 is between a user viewing the viewing surface of display 104 and the docked portable computer. In some embodiments, at least a portion of portable computer 112 is obscured when docked. In some embodiments, at least a portion of the materials that define the docking area comprise a heat conductive material that can be used to dissipate heat from portable computer 112. In various embodiments, heat generated by the docking station and/or the portable computer docked in the docking station is dissipated using one or more of the following included in the docking station: a vent, a fan, a heat sink, and a liquid cooling device. In various embodiments, one or more peripheral devices are integrated into docking station 102. In the diagram shown, camera 114 is integrated with docking station 102. Examples of other peripheral devices integrated with docking station 102 include one or more of the following: a speaker, a microphone, a storage device, a memory card reader, a telephonic handset, a battery charger, web cam, and a remote control signal receiver.

In some embodiments, a coupling interface couples docking station 102 and portable computer 112. The coupling interface allows one or more the following: communication of data between docking station 102 and a docked portable computer 112, physically securing portable computer 112 to docking station 102, and providing power to portable computer 112. Examples of data communicated between docking station 102 and portable computer 112 includes display data rendered by portable computer 112 to be displayed on display 104, docking notification data, docking configuration setting data, and data associated with one or more devices integrated with and/or connected to docking station 102. The docking notification data can be used by portable computer 112 to configure portable computer 112 for docked use. For example, in some embodiments the docking notification causes portable computer 112 to turn on and/or exit from standby/hibernation mode, use display 104 rather than an integrated display of portable computer 112 to display data rendered by portable computer 112, and switch a power management profile of portable computer 112.

In some embodiments, at least a portion of data communicated between portable computer 112 and docking station 102 (including any device integrated with or attached to the docking station) is performed wirelessly (e.g., radio communication). For example, short-range wireless data communication standards such as BLUETOOTH, wireless networking standards such as IEEE 802.11, and/or any other standards based or proprietary wireless communication specification is used to communicate data between portable computer 112 and docking station 102. In some embodiments, wireless communication between portable computer 112 and docking station 102 is performed directly between the devices. In some embodiments, wireless communication between portable computer 112 and docking station 102 is performed through at least one intermediary device such as a wireless access point. In some embodiments, a radio communication component of portable computer 112 uses an antenna of docking station 102. For example, a wireless communication antenna integrated and/or attached on docking station 102 is used by a wireless networking card of the portable computer to send/and receive information when docked in the docked in the docking station. In some embodiments, at least a portion of data communicated between portable computer 112 and docking station 102 (including any device integrated with or attached to the docking station) is performed using infrared data communication. In some embodiments, wireless protocols such as BLUETOOTH are used to enable wireless input and/or other peripheral devices, such as a keyboard, mouse, or other input device, to be used seamlessly to provide input to the portable computer whether in the docked or undocked state.

Figure 1B:
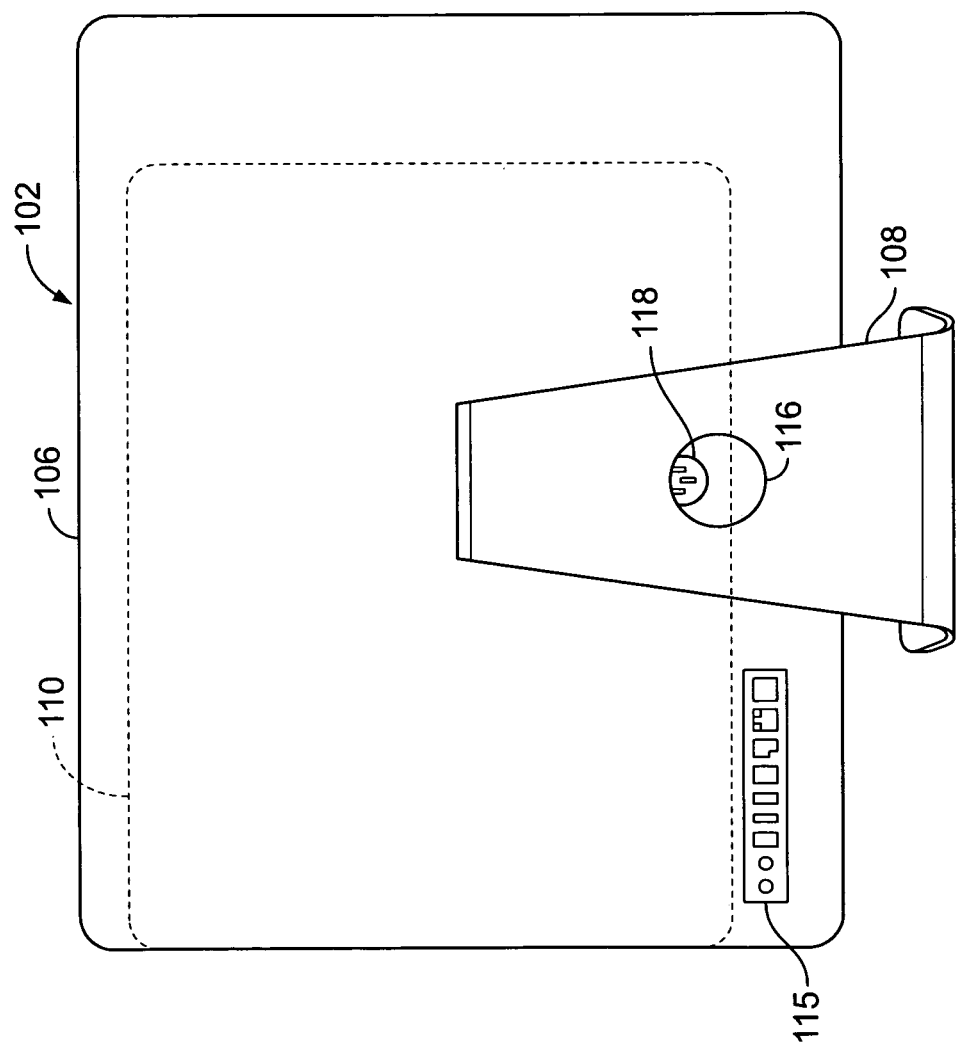

FIG. 1B is a diagram illustrating a rear view of the docking station. Ports 115 include one or more connector ports. In some embodiments, ports 115 include one or more of the following ports: a USB port, a FIREWIRE port, an audio input port, an audio output port, a microphone port, an external display port, a networking port, a telephony port, and various other types of data communication ports. Devices connected to a corresponding one of ports 115 communicates with portable computer 112 via the port when portable computer 112 is docked in docking station 102. One or more cables connected to docking station 102 can be threaded through hole 116 of stand 108 for cable organization. Power port 118 connects docking station 102 to a cable providing power to the docking station. In some embodiments, power is provided to docking station 102 using a corded wall outlet plug. In some embodiments, power is provided to docking station 102 by a battery either housed in docking station 102 and/or a battery housed in portable computer 112. In some embodiments, at least a portion of the power provided to docking station 102 is used to power portable computer 112 when docked in docking station 102. Powering the portable computer 112 includes charging a battery associated with portable computer 112. Power is provided to portable computer through an electrical contact made between docking station 102 and portable computer 112. In some embodiments, power is provided to computer 112 using inductive power that does not require an electrical contact between docking station 102 and portable computer 112. In some embodiments, at least a portion of the power provided to docked portable computer 112 is used to power docking station 102, e.g., to provide electrical power to display 104. For example, portable computer 112 can be docked in docking station 102 while the portable computer is plugged into an electrical power outlet.

Figure 1C:
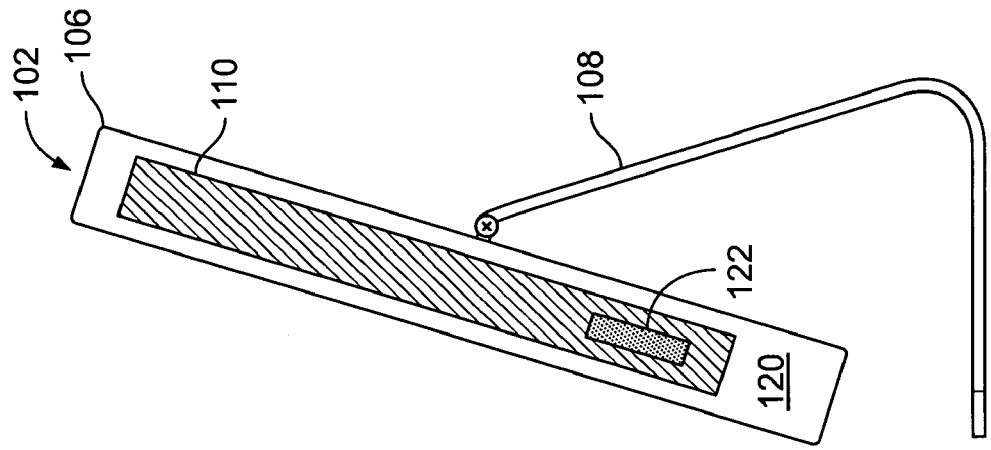

FIG. 1C is a diagram illustrating a side view of the docking station without a docked portable computer. Docking area 110 in the example shown comprises a cavity of docking station 102. The cavity in some embodiments is defined at least in part by one or more interior surfaces and a cutout region in a side wall 120 of housing 106. In some embodiments one or more interior surfaces that define at least a portion of docking area 110 are configured to support portable computer 112 when docked. Portable computer 112 slides into docking area 110 for docking. In the example shown, connector 122 connects to one or more connecting ports on the docking connection side of portable computer 112. In some embodiments, the one or more connection ports of portable computer 112 are a subset of ports on the docking connection side of portable computer 112. The one or more connection ports of portable computer 112 may either be a proprietary port for coupling with the docking station or a port that can be used for other purposes besides coupling with a docking station (e.g., a standard external monitor port and a standard power port used to couple the portable computer with the docking station as well as used to connect other external devices). In some embodiments, connector 122 is associated with the coupling interface described previously. Connector 122 is lined up the one or more ports of portable computer 112 so that they automatically engage when portable computer 112 is docked. In some embodiments, connector 122 magnetically engages with the portable computer port(s). In some embodiments, connector 122 is optional (e.g., wireless coupling).

Figure 1D:
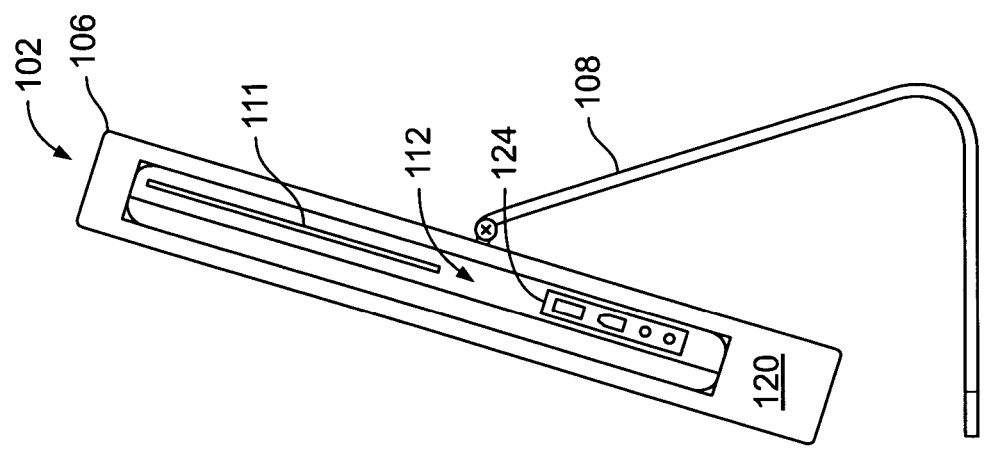

FIG. 1D is a diagram illustrating a side view of the docking station with a docked portable computer. In the example shown, only one surface of portable computer 112 is exposed when docked in docking station 102. The remaining surfaces are received fully into and obscured from view by the docking station 102. In some alternative embodiments, only one surface of portable computer 112 is exposed fully when docked in docking station 102 and one or more other surfaces are exposed only partly. In some embodiments, portable computer 112 does not insert completely into docking area 110, and instead an end portion extends beyond docking area 110, e.g., to provide a way to grip and extract the portable computer 112 from the docking station 102. In other embodiments, portable computer 112 inserts fully into docking area 110 and a button or other mechanism is provided and configured to eject the portable computer 112 when activated. Optical (or other) drive 111 of portable computer 112 is exposed for use while portable computer 112 is docked. In various embodiments, at least one media drive of the portable computer is exposed for use while portable computer 112 is docked. In the example shown ports 124 of portable computer 112 is exposed for use while the portable computer is docked. In various embodiments, one or more ports of portable computer 112 are exposed for use while the portable computer is docked.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A docking station comprising:
   a display;
   a housing configured to hold the display in a manner that exposes a viewing surface of the display to view, the housing defining a docking area configured to receive a portable computer; and
   a wireless communication antenna that is integrated with or attached to the housing and that is configured to be connected used by a wireless networking card of the portable computer when docked to send and receive communications from and to the portable computer;
   wherein the docking area is at least partly obscured by the display when viewed from the viewing surface side of the display at an angle substantially orthogonal to the viewing surface; and
   wherein the housing defines an opening on one or both of a left or right side of the housing that allows the portable computer to be linearly inserted along a substantially horizontal direction through the opening and into the docking area.

2. A docking station as recited in claim 1, wherein the display is configured to display an image rendered by a portable computer at least when the portable computer is docked in the housing.

3. A docking station as recited in claim 1, wherein the docking area is substantially larger in a first dimension and a second dimension than in a third dimension, and the first and second dimensions define a plane that is substantially parallel to the viewing surface, and the third dimension is substantially orthogonal to the viewing surface.

4. A docking station as recited in claim 1, wherein the docking area is configured such that when the portable computer is docked in the housing, a first plane parallel to the viewing surface is substantially parallel to a second plane parallel to at least one largest face of an imaginary rectangular polyhedron of the least possible volume that can contain the docked portable computer.

5. A docking station as recited in claim 1, wherein the docking area is configured such that a plane parallel to at least one largest face of an imaginary rectangular polyhedron of the least possible volume that can contain the portable computer docked in the housing is more parallel than normal to the direction of gravity.

6. A docking station as recited in claim 1, wherein docking station is mountable on a vertical surface.

7. A docking station as recited in claim 1, wherein when the portable computer is docked in the housing, the portable computer is at least partially obscured by the docking station.

8. A docking station as recited in claim 1, wherein at least a portion of the docking area includes a heat conductive material.

9. A docking station as recited in claim 8, wherein the heat conductive material dissipates heat generated by the portable computer.

10. A docking station as recited in claim 1, wherein heat generated by the docking station or the portable computer docked in the docking station is dissipated using one or more of the following included in the housing: a vent, a fan, a heat sink, and a liquid cooling device.

11. A docking station as recited in claim 1, wherein the housing holds one or more of the following: a camera, a speaker, a microphone, a storage device, a memory card reader, a telephonic handset, a battery charger, and a remote control signal receiver.

12. A docking station as recited in claim 1, wherein a coupling interface allows communication of data between the docking station and the portable computer when docked in the housing.

13. A docking station as recited in claim 12, wherein the communication of data between the docking station and the portable computer includes one or more of the following: communication of the image rendered by the portable computer to the display, communication of docking configuration setting data, and communication of data associated with one or more devices integrated with or attached to the docking station.

14. A docking station as recited in claim 12, wherein the communication of data between the docking station and the portable computer includes communication of docking notification data that at least in part causes the docked portable computer to perform one or more of the following: power on, exit from a standby/hibernation mode, use the display of the docking station rather than an integrated display of the portable computer, and switch a power management profile.

15. A docking station as recited in claim 12, wherein the coupling interface physically secures the portable computer to the docking station.

16. A docking station as recited in claim 12, wherein the coupling interface provides power to the docked portable computer.

17. A docking station as recited in claim 1, wherein at least a portion of data communicated between the portable computer and the docking station, including any integrated or attached device of the docking station, is communicated using radio communication.

18. A docking station as recited in claim 17, wherein the radio communication is associated with one or more of the following: a short-range wireless data communication standard, BLUETOOTH, a wireless networking standard, IEEE 802.11 standard, and a proprietary wireless communication specification.

19. A docking station as recited in claim 1, wherein a radio communication component of the portable computer uses an antenna integrated or attached on the docking station when the portable computer is docked in the housing.

20. A docking station as recited in claim 1, wherein the docking station includes one or more ports that enable a device attached to one or more of the ports to communicate with the portable computer when the portable computer is docked in the housing.

21. A docking station as recited in claim 1, wherein power is provided to the docking station by a battery either included in the docking station or included in the portable computer when docked in the housing.

22. A docking station as recited in claim 1, wherein power is inductively provided from the docking station to the portable computer when docked in the housing without using a conductive electrical contact between the docking station and the docked portable computer.

23. A docking station as recited in claim 1, wherein power is provided to the docking station from the portable computer when the portable computer is docked in the housing.

24. A docking station as recited in claim 1, wherein at most one surface of an imaginary rectangular polyhedron substantially conforming to the portable computer is exposed when the portable computer is docked in the housing.

25. A docking station as recited in claim 1, wherein at least one media drive of the portable computer is exposed for use while the portable computer is docked in the housing.

26. A docking station as recited in claim 1, wherein the docking station further comprises a stand that has one or more of the following characteristics: is removable and includes a pass-through hole for organizing one or more cables attached to the docking station.

* * * * *

UNITED STATES PATENT AND TRADEMARK OFFICE
CERTIFICATE OF CORRECTION

| | | |
|---|---|---|
| PATENT NO. | : 7,684,185 B2 | Page 1 of 1 |
| APPLICATION NO. | : 11/481153 | |
| DATED | : March 23, 2010 | |
| INVENTOR(S) | : Augustin Farrugia | |

It is certified that error appears in the above-identified patent and that said Letters Patent is hereby corrected as shown below:

On First Page, in field (56), under "U.S. Patent Documents", in Column 1, line 7, delete "361/683" and insert -- 361/679.6 --, therefor.

On First Page, in field (56), under "U.S. Patent Documents", in Column 2, line 8, delete "361/683" and insert -- 361/679.55 --, therefor.

Signed and Sealed this
Twenty-second Day of November, 2011

David J. Kappos
*Director of the United States Patent and Trademark Office*